United States Patent
Nonomura et al.

[11] Patent Number: 6,155,722
[45] Date of Patent: Dec. 5, 2000

[54] TWIN-CORE FERRULE STRUCTURE FOR AN OPTICAL CONNECTOR

[75] Inventors: Masanori Nonomura; Satoshi Takehana; Takeyasu Nakayama, all of Nagano; Ikuo Maeda, Shizuoka; Akihiro Masuda, Shizuoka; Takashi Kato, Shizuoka, all of Japan

[73] Assignees: Totoku Electric Co., Ltd.; FDK Corporation, both of Tokyo, Japan

[21] Appl. No.: 09/228,096

[22] Filed: Jan. 11, 1999

[51] Int. Cl.⁷ .................................................. G02B 6/36
[52] U.S. Cl. ................................................ 385/84; 385/67
[58] Field of Search ................................. 385/84, 67, 59, 385/68

[56] References Cited

U.S. PATENT DOCUMENTS 4,239,333 12/1980 Dakss et al. ......................... 350/96.21
5,675,681 10/1997 Chiaretti et al. ......................... 385/59

*Primary Examiner*—Hung N. Ngo
*Attorney, Agent, or Firm*—Jordan and Hamburg LLP

[57] ABSTRACT

A twin-core ferrule structure is provided which is miniaturized in size, facilitated for accurate positioning the optical axes of two optical fibers, and improved both in degree of freedom of determining a shape and in high-volume productivity. The twin-core ferrule 21 comprises a cylindrical sleeve 22 having a first optical fiber element fitting hole 23 provided in the front region of a circular cylindrical body thereof to extend along the center axis of the same, a second optical fiber element fitting hole 24 provided in the same to extend eccentric to the center axis of the circular cylindrical body and in parallel with the first optical fiber element fitting hole 23, and an eccentric cylindrical hole 25 provided in the rear region of the circular cylindrical body to extend with the center axis coinciding with the center line between the first and second optical fiber element fitting holes 23 and 24, into which an optical fiber core is fitted, wherein the cylindrical sleeve 22 is monolithically formed by injection molding of a metal material.

6 Claims, 5 Drawing Sheets

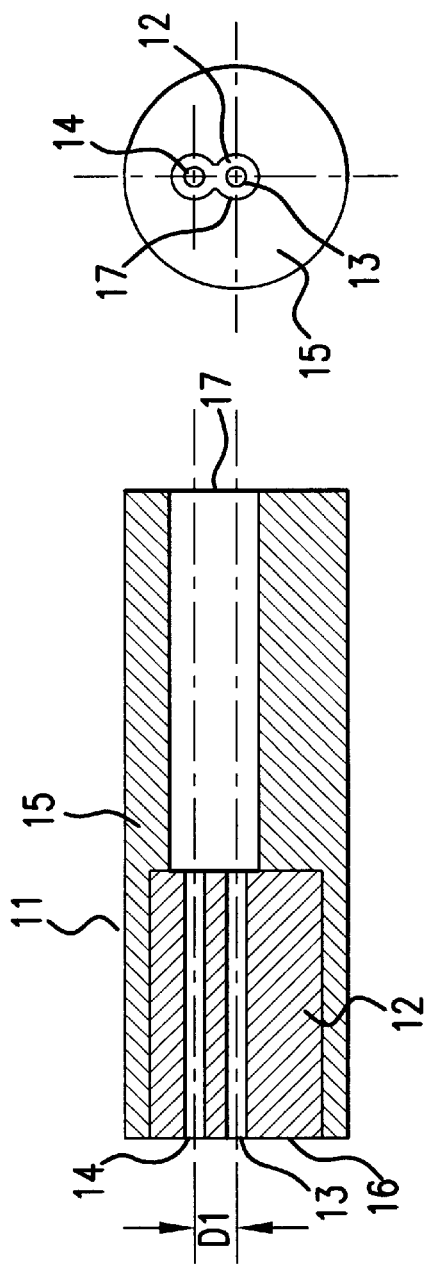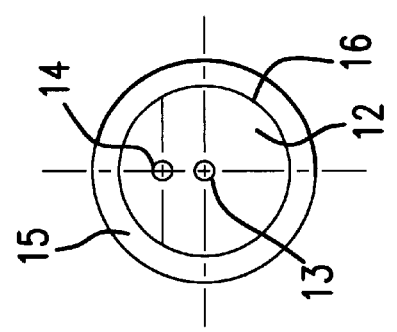

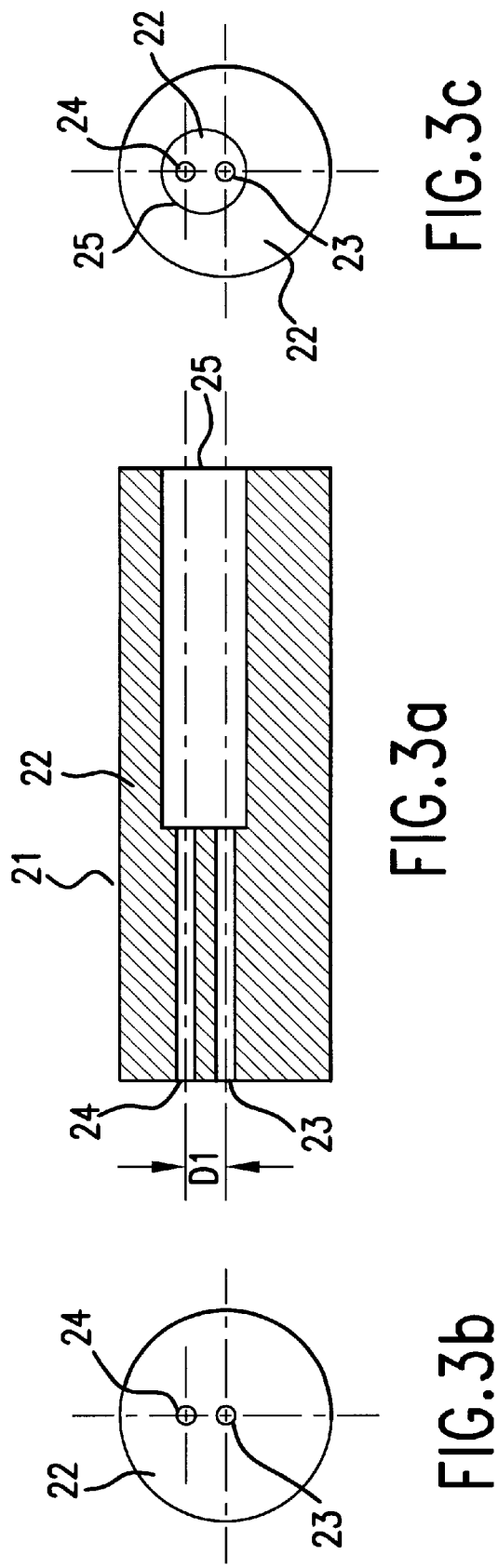

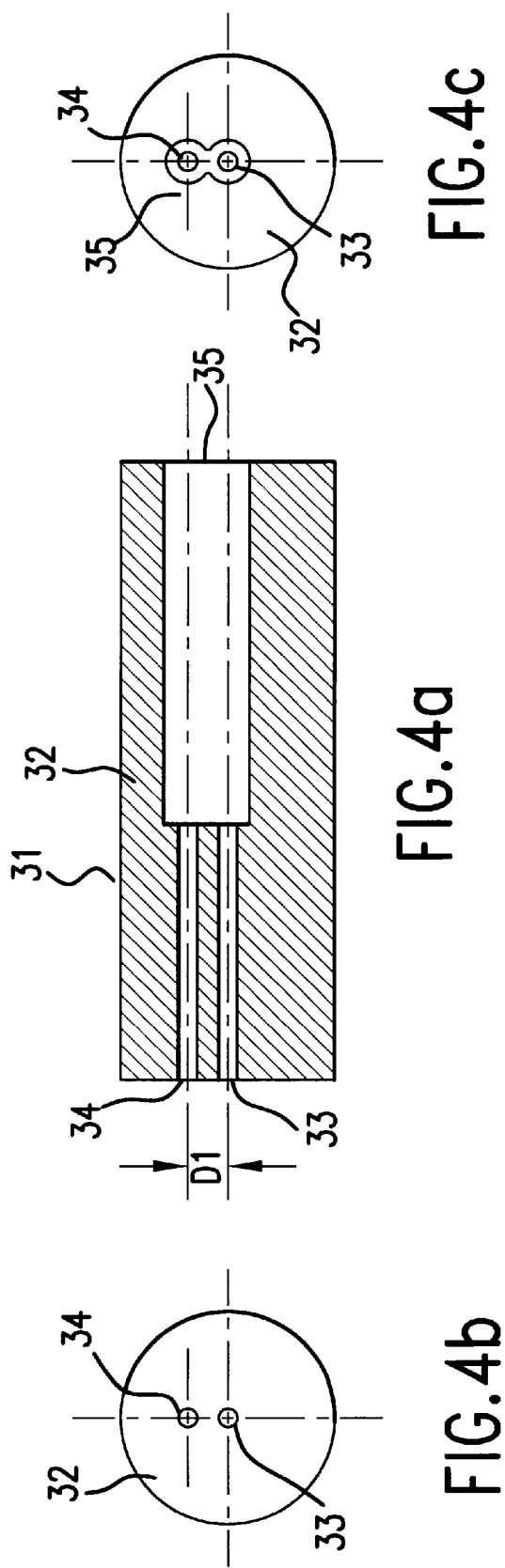

TWIN-CORE FERRULE STRUCTURE FOR AN OPTICAL CONNECTOR

BACKGROUND OF THE INVENTION

1. Field of the Invention

The present invention relates to a twin-core ferrule structure for an optical fiber connector and particularly, to a twin-core ferrule structure which is small in size and improved in high-volume productivity.

2. Description of the Prior Art

It is common for fitting two optical fibers in parallel at a desired position to insert and bond the two optical fibers into their respective single-core ferrules and then arrange in parallel and join the two single-core ferrules to each other. FIG. 5 is a longitudinally cross sectional view of the two single-core ferrules arranged in parallel. As shown, the single-core ferrules are denoted by 51 and 61 having the same structure. For ease of the description, the single-core ferrule 51 will be explained herein while identical components of the single-core ferrule 61 to those of the single-core ferrule 51 are denoted by parenthesized numerals. The single-core ferrule 51 (61) has a structure which comprises a cylindrical sleeve 54 (64) having a cylindrical hole 55 (65) provided in the front region of a medium-diameter circular cylindrical body hereof for accepting a capillary 52 (62) and a cylindrical hole 56 (66) provided in the rear region thereof, of which inner diameter is substantially identical to that of the cylindrical hole 55 (65), for accepting an optical fiber core, and the capillary 52 (62) having a fitting hole 53 (63) provided axially in a small-diameter circular cylindrical body thereof for accepting an optical fiber element. In the structure, the capillary 52 (62) is pressed into the cylindrical hole 55 (65) in the front region of the cylindrical sleeve 54 (64). In the conventional single-core ferrule 51 (61), the cylindrical sleeve 54 (64) is fabricated by cutting a stainless steel material, and the capillary 52 (62) is shaped by sintering a powdered zirconia ($ZiO_2$). The single-core ferrule 51 is joined in parallel with the single-core ferrule 61 and their resultant assembly is used as a twin-core ferrule 50.

An example of the twin-core ferrule 50 composed of two parallel joined single-core ferrules may be provided in which, when the optical fiber element having a diameter of 125 μm is employed, the diameter of the optical fiber element fitting hole 53 (63) in the capillary 52 (62) is 126 μm, the outer diameter of the capillary 52 (62) is 1.4 mm, the diameter of the cylindrical holes 55 (65) and 56 (66) in the front and rear regions of the cylindrical sleeve 54 (64) is 1.4 mm, the outer diameter of the cylindrical sleeve 54 (64) is 2.5 mm, the width of the two single-core ferrules 51 and 61 joined in parallel is 5.0 mm, and the distance D2 between the centers of the two optical fiber element fitting holes 53 and 63 is 2.5 mm.

In such a conventional twin-core ferrule consisting of two parallel joined single-core ferrules, the distance between its two optical fiber element fitting holes is determined by the outer diameter of the cylindrical sleeves. Reducing the distance between the two optical fiber element requires a decrease in the outer diameter of the cylindrical sleeves, but the decrease has a limit. This retards the miniaturization of the overall dimensions of optical connectors while relevant optical components have successfully been decreased in size. Also, the cylindrical sleeve of any conventional ferrule is fabricated by cutting a stainless steel material and will hardly be advantageous for high-volume production. Although the ferrule is intended to have an improved shape for miniaturizing its size and enhancing its functions, its shape is tailored through cutting process and will thus be limited in design and dimensions.

SUMMARY OF THE INVENTION

It is a first object of the present invention to provide a twin-core ferrule structure which can be miniaturized in size, facilitated for positioning the optical axes of two optical fibers at higher precision, and improved both in degree of freedom of determining a shape and in high-volume productivity.

In addition to the above-described first object, it is a second object of the present invention to provide a twin-core ferrule structure which consists of a smaller number of components and is thus lower in production cost.

As a first feature of the present invention, a twin-core ferrule structure for an optical connector is provided comprising: a capillary having a first optical fiber element fitting hole provided in a small-diameter circular cylindrical body thereof to extend along the center axis of the same and a second optical fiber element fitting hole provided in the same to extend eccentric to the center axis of the small-diameter circular cylindrical body and in parallel with the first optical fiber element fitting hole; and a cylindrical sleeve having a cylindrical hole provided in the front region of a medium-diameter circular cylindrical body thereof to extend with the center axis coinciding with the center axis of the medium-diameter circular cylindrical body, into which the capillary is fitted, and an eccentric cylindrical hole provided in the rear region of the same to extend with the center axis deviating from the center axis of the medium-diameter circular cylindrical body, into which an optical fiber core is fitted, wherein the cylindrical sleeve is formed by injection molding of a metal material and the center line between the first and second optical fiber element fitting holes in the capillary which is fitted into the cylindrical hole provided in the front region of the cylindrical sleeve coincides with the center axis of the eccentric cylindrical hole. For ease of guiding and inserting the optical fiber elements into the first and second optical fiber element fitting holes, the twin-core ferrule structure may be modified in which the cross section of the eccentric cylindrical hole provided in the rear region of the cylindrical sleeve is either an round shape or an elliptic shape whose major axis extends across the first and second optical fiber element fitting holes and its center axis coincides with the center line between the first and second optical fiber element fitting holes in the capillary. Furthermore, for decreasing a play of the optical fiber core in the eccentric cylindrical hole and any possibility of physical injury to the optical fiber core, the twin-core ferrule may be modified in which the cross section of the eccentric cylindrical hole provided in the rear region of the cylindrical sleeve is a snowman-like shape, and the center line extending along one half of the snowman-like shape coincides with the center axis of the first optical fiber element fitting hole in the capillary while the center line extending along the other half of the same coincides with the center axis of the second optical fiber element fitting hole in the capillary.

As a second feature of the present invention, a twin-core ferrule structure for an optical connector is provided comprising: a cylindrical sleeve having a first optical fiber element fitting hole provided in the front region of a circular cylindrical body thereof to extend along the center axis of the same, a second optical fiber element fitting hole provided in the same to extend eccentric to the center axis of the circular cylindrical body and in parallel with the first optical fiber element fitting hole, and an eccentric cylindrical hole provided in the rear region of the circular cylindrical body to extend with the center axis coinciding with the center line between the first and second optical fiber element fitting holes, into which an optical fiber core is fitted, wherein the cylindrical sleeve is monolithically formed by injection molding of a metal material. For ease of guiding and inserting the optical fiber elements into the first and second optical fiber element fitting holes, the twin-core ferrule structure may be modified in which the cross section of the eccentric cylindrical hole provided in the rear region of the cylindrical sleeve is either an round shape or an elliptic shape whose major axis extends across the first and second optical fiber element fitting holes and its center axis coincides with the center line between the first and second optical fiber element fitting holes provided in the front region of the cylindrical sleeve. Also, for decreasing a play of the optical fiber core in the eccentric cylindrical hole and any possibility of physical injury to the optical fiber core, the twin-core ferrule may be modified in which the cross section of the eccentric cylindrical hole provided in the rear region of the cylindrical sleeve is a snowman-like shape, and the center line extending along one half of the snowman-like shape coincides with the center axis of the first optical fiber element fitting hole in the front region of the cylindrical sleeve while the center line extending along the other half of the same coincides with the center axis of the second optical fiber element fitting hole in the same.

In the twin-core ferrule structure for an optical connector according to the first feature of the present invention, two optical fiber elements are fitted into one cylindrical sleeve to be combined in parallel as spaced by a very small distance, hence contributing to the extremely small size of the ferrule structure. Also, the first optical fiber element fitting hole is aligned with the center axis of the capillary while the second optical fiber element fitting hole is deviated by a small distance from the center axis of the capillary but extends in parallel with the first optical fiber element fitting hole. Since the process for making the two holes, one extending in parallel with and the other deviating from the center axis of the circular cylindrical body, is eased and increased in the dimensional accuracy, the resultant ferrule is improved in the positional accuracy of the optical axis and the efficiency of production. Moreover, the optical axes of the two optical fiber elements are distanced different from the center axis of the ferrule. This allows the two optical fiber to be easily distinguished. Accordingly, the application of the twin-core optical fibers will be increased more than such conventional use as optical splitters, optical switches, and optical isolators. The cylindrical sleeve is formed by the injection molding of a metal material and thus can be tailored to a desired intricate shape, which is hardly accomplished by any conventional cutting process. As the result, the ferrule structure will be improved in the function and favorable for high-volume production.

In the twin-core ferrule structure for an optical connector according to the second feature of the present invention, the entirety of the ferrule structure is made by injection molding of a metal material. Since the ferrule structure consists of a single component and the number of its production steps is decreased, its production efficiency will increase.

BRIEF DESCRIPTION OF THE DRAWINGS

FIG. 1 illustrates a first embodiment of the twin-core ferrule structure according to the present invention, where

FIG. 2 illustrates a second embodiment of the twin-core ferrule structure according to the present invention, where FIGS. 2(a), 2(b), and 2(c) are a longitudinally cross sectional view, a side view at front end, and a side view at rear end of the same respectively;

FIG. 3 illustrates a third embodiment of the twin-core ferrule structure according to the present invention, where FIGS. 3(a), 3(b), and 3(c) are a longitudinally cross sectional view, a side view at front end, and a side view at rear end of the same respectively;

FIG. 4 illustrates a fourth embodiment of the twin-core ferrule structure according to the present invention, where FIGS. 4(a), 4(b), and 4(c) are a longitudinally cross sectional view, a side view at front end, and a side view at rear end of the same respectively.

DETAILED DESCRIPTION OF THE PREFERRED EMBODIMENTS

Some embodiments of the twin-core ferrule structure for an optical connector according to the present invention will be described in more detail with referring to the accompanying drawings. The present invention is not limited to the embodiments.

Figure 1C:
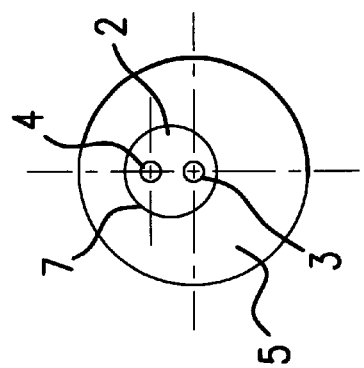
FIGS. 1(a), 1(b), and 1(c) are a longitudinally cross sectional view, a side view at front end, and a side view at rear end of the same respectively.
Figure 1A:
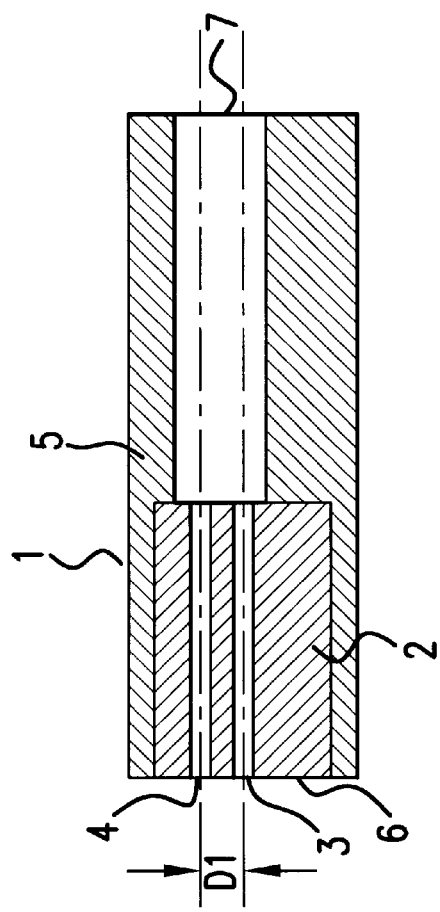
Figure 1B:
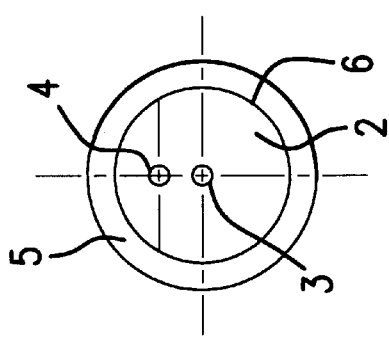
Figure 5:
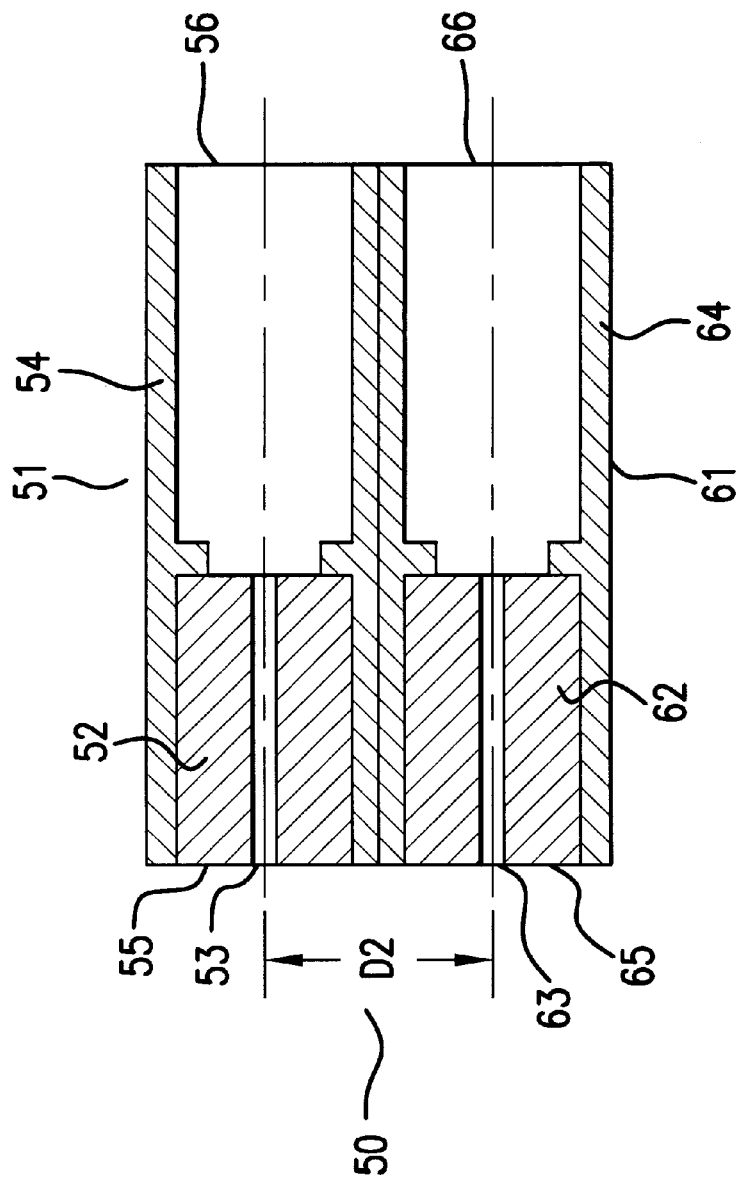
FIG. 5 is a longitudinally cross sectional view of a conventional twin-core ferrule structure in which a pair of single-core ferrules are joined in parallel.

FIG. 1 illustrates a first embodiment of a twin-core ferrule structure for an optical connector according to the present invention, where FIGS. 1(a), 1(b), and 1(c) are a longitudinally cross sectional view, a side view at front end, and a side view at rear end of the same respectively. In FIG. 1, a twin-core ferrule for an optical connector is denoted by 1. The twin-core ferrule for an optical connector 1 comprises a cylindrical sleeve 5 having a cylindrical hole 6 provided in the front region of a medium-diameter circular cylindrical body thereof to extend coaxially of the medium-diameter circular cylindrical body and a cylindrical hole 7 provided in the rear region of the same and arranged of which the center axis is deviated from the center axis of the cylindrical hole 6 and of which the diameter is smaller than that of the cylindrical hole 6, and a capillary 2 having a first optical fiber element fitting hole 3 provided in a small-diameter circular cylindrical body thereof to extend along the center axis of the same and a second optical fiber element fitting hole 4 provided in the same to have a small distance D1 from and in parallel with the first optical fiber element fitting hole 3. The capillary 2 is pressed into the cylindrical hole 6. In particular, the center line between the first and second optical fiber element fitting holes 3 and 4 in the capillary 2 coincides with the center axis of the cylindrical hole 7 in the rear region of the cylindrical sleeve 5. Although the cylindrical hole 7 in the rear region of the cylindrical sleeve 5 of the embodiment shown in FIG. 1 is round in cross section, it may have an ellipse shape in cross section of which the major axis extends across the first and second optical fiber element fitting holes 3 and 4.

The cylindrical sleeve 5 of this embodiment is formed by injection molding of a metal material such as iron(Fe)-chrome(Cr)-nickel(Ni) ternary metal. As for understanding of the injection molding of a metal material, its procedure comprises the steps of kneading small particles of metal components into pellet form, subjecting the pellets to an injection molding process with a molding machine and a set of molds to produce a cylindrical sleeve, sintering the cylindrical sleeve at as a high temperature as 1300° C., and subjecting the cylindrical sleeve to a finishing process such as plating on the outer surface to have a product.

The capillary 2 may be similar to that of the prior art which is made by sintering a powdered zirconia ($ZrO_2$).

An example of the twin-core ferrule of the embodiment using a single-mode optical fiber of 125 μm in element diameter is provided in which the diameter of the optical fiber element fitting holes 3 and 4 of the capillary 2 is 126 μm, the distance D1 between the center axes of the two optical fiber element fitting holes 3 and 4 is 0.3 mm, the outer diameter of the capillary 2 is 1.4 mm, the diameter of the cylindrical hole 6 in the front region of the cylindrical sleeve 5 is 1.4 mm, the diameter of the cylindrical hole 7 in the rear region of the same is 1.0 mm, and the outer diameter of the cylindrical sleeve 5 is 2.0 mm.

As compared with the twin-core ferrule of the aforesaid prior art consisting of two single-core ferrules joined in parallel, the twin-core ferrule of the example described above is decreased by 3 mm (i.e. a rate of ⅔) in the outer diameter and by 2.2 mm (i.e. a rate of about ⅛) in the distance between the two optical fiber element fitting holes.

FIG. 2 illustrates a second embodiment of the twin-core ferrule structure for an optical connector according to the present invention, where FIG. 2(a) is a longitudinally cross sectional view, FIG. 2(b) is a side view at the front end, and FIG. 2(c) is a side view at the rear end of the same. The two-core ferrule 11 of the second embodiment is identical to that of the first embodiment shown in FIG. 1, except that the cylindrical hole 17 in the rear region of the cylindrical sleeve 15 has a snowman-like shape in cross section; therefore, the description thereof is omitted.

FIG. 3 illustrates a third embodiment of the twin-core ferrule structure for an optical connector of the present invention, where FIG. 3(a) is a longitudinally cross sectional view, FIG. 3(b) is a side view at the front end, and FIG. 3(c) is a side view at the rear end of the same. The two-core ferrule 21 of the third embodiment shown in FIG. 3 comprises a cylindrical sleeve 22 having a first optical fiber element fitting hole 23 provided in the front region of a circular cylindrical body thereof to extend along the center axis of the circular cylindrical body, a second optical fiber element fitting hole 24 provided in the front region of the same to extend in parallel with the first optical fiber element fitting hole 23 and arranged of which the center axis is deviated by a small distance D1 from the center axis of the first optical fiber element fitting hole 23, and an eccentric cylindrical hole 25 provided in the rear region of the same and arranged of which the center axis deviates from the center axis of the circular cylindrical body but coincides with a center line between the two center axes of the first and second optical fiber element fitting holes 23 and 24. Although the eccentric cylindrical hole 25 in the rear region of the cylindrical sleeve 22 of the embodiment shown in FIG. 3 has a round shape in cross section, its cross section may be an elliptic shape of which the major axis extends across the first and second optical fiber element fitting holes 23 and 24 provided in the front region of the cylindrical sleeve 22. The cylindrical sleeve 25 may be tailored to a monolithic form by injection molding of a metal material such as iron(Fe)-chrome(Cr)-nickel(Ni) ternary metal. Accordingly, the twin-core ferrule 21 of the third embodiment has a different configuration from the twin-core ferrules 1 and 11 of the aforesaid first and second embodiments in being monolithically formed by injection molding of a metal material with no capillary.

An example of the twin-core ferrule of this embodiment using a single-mode optical fiber of 125 μm in element diameter is provided in which the diameter of the outer diameter of the cylindrical sleeve 22 is 2.0 mm, the diameters of the optical fiber element fitting holes 23 and 24 in the front region of the cylindrical sleeve 22 are 126 μm, the distance D1 between the center axes of the two optical fiber element fitting holes 23 and 24 is 0.3 mm, and the diameter of the eccentric cylindrical hole 25 in the rear region of the cylindrical sleeve 22 is 1.0 mm.

FIG. 4 illustrates a fourth embodiment of the twin-core ferrule structure for an optical connector according to the present invention, where FIG. 4(a) is a longitudinally cross sectional view, FIG. 4(b) is a side view at the front end, and FIG. 4(c) is a side view at the rear end of the same. The two-core ferrule 31 of the fourth embodiment is identical to that of the third embodiment shown in FIG. 3, except that the eccentric cylindrical hole 35 in the rear region of the cylindrical sleeve 32 has a snowman-like shape in cross section; therefore, the description thereof is omitted.

The twin-core ferrule structure according to the present invention brings about the following effects that: (1) the two optical fibers are closely fitted in one cylindrical sleeve hence miniaturizing the overall size of the ferrule structure; (2) the center axis of one of the two optical fiber element fitting holes coincides with the center axis of the ferrule while the center axis of the other is deviated from the same and is parallel with the foregoing optical fiber element fitting hole along the center axis of the ferrule, whereby the ferrule can be enhanced in the dimensional precision and the positional accuracy of the optical path; (3) the two optical fiber element fitting holes are arranged in the relationship stated in the above paragraph (2) and can thus be distinguished with much ease for use in various applications; and (4) the ferrule structure is fabricated by injection molding of a metal material and can hence be suited for high-volume production and tailored to desired shapes; particularly, the monolithic molding of the whole ferrule structure by metal injection reduces the number of components and lowers the production cost of the ferrule.

What is claimed is:

1. A twin-core ferrule structure for an optical connector comprising:

a capillary having a first optical fiber element fitting hole provided in a small-diameter circular cylindrical body thereof to extend along the center axis of the same and a second optical fiber element fitting hole provided in the same to extend eccentric to the center axis of the small-diameter circular cylindrical body and in parallel with the first optical fiber element fitting hole; and a cylindrical sleeve having a cylindrical hole provided in the front region of a medium-diameter circular cylindrical body thereof to extend with the center axis coinciding with the center axis of the medium-diameter circular cylindrical body, into which the capillary is fitted, and an eccentric cylindrical hole provided in the rear region of the same to extend with the center axis deviating from the center axis of the medium-diameter circular cylindrical body, into which an optical fiber core is fitted, wherein the cylindrical sleeve is formed by injection molding of a metal material and the center line between the first and second optical fiber element fitting holes in the capillary which is fitted into the cylindrical hole provided in the front region of the cylindrical sleeve coincides with the center axis of the eccentric cylindrical hole.

2. A twin-core ferrule structure for an optical connector according to claim 1, wherein the cross section of the eccentric cylindrical hole provided in the rear region of the cylindrical sleeve is either an round shape or an elliptic shape whose major axis extends across the first and second optical fiber element fitting holes and its center axis coincides with the center line between the first and second optical fiber element fitting holes in the capillary.

3. A twin-core ferrule structure for an optical connector according to claim 1, wherein the cross section of the eccentric cylindrical hole provided in the rear region of the cylindrical sleeve is a snowman-like shape, and the center line extending along one half of the snowman-like shape coincides with the center axis of the first optical fiber element fitting hole in the capillary while the center line extending along the other half of the same coincides with the center axis of the second optical fiber element fitting hole in the capillary.

4. A twin-core ferrule structure for an optical connector comprising:

a cylindrical sleeve having a first optical fiber element fitting hole provided in the front region of a circular cylindrical body thereof to extend along the center axis of the same, a second optical fiber element fitting hole provided in the same to extend eccentric to the center axis of the circular cylindrical body and in parallel with the first optical fiber element fitting hole, and an eccentric cylindrical hole provided in the rear region of the circular cylindrical body to extend with the center axis coinciding with the center line between the first and second optical fiber element fitting holes, into which an optical fiber core is fitted, wherein the cylindrical sleeve is monolithically formed by injection molding of a metal material.

5. A twin-core ferrule structure for an optical connector according to claim 4, wherein the cross section of the eccentric cylindrical hole provided in the rear region of the cylindrical sleeve is either an round shape or an elliptic shape whose major axis extends across the first and second optical fiber element fitting holes and its center axis coincides with the center line between the first and second optical fiber element fitting holes provided in the front region of the cylindrical sleeve.

6. A twin-core ferrule structure for an optical connector according to claim 4, wherein the cross section of the eccentric cylindrical hole provided in the rear region of the cylindrical sleeve is a snowman-like shape, and the center line extending along one half of the snowman-like shape coincides with the center axis of the first optical fiber element fitting hole in the front region of the cylindrical sleeve while the center line extending along the other half of the same coincides with the center axis of the second optical fiber element fitting hole in the same.

* * * * *